US006806471B2

(12) United States Patent
Matsukuma et al.

(10) Patent No.: US 6,806,471 B2
(45) Date of Patent: Oct. 19, 2004

(54) FLAME DETECTION DEVICE

(75) Inventors: Hidenari Matsukuma, Kanagawa-ken (JP); Masahiko Nemoto, Kanagawa-ken (JP); Hiroshi Shima, Kanagawa-ken (JP)

(73) Assignee: Hochiki Corporation (JP)

( * ) Notice: Subject to any disclaimer, the term of this patent is extended or adjusted under 35 U.S.C. 154(b) by 62 days.

(21) Appl. No.: 10/266,699

(22) Filed: Oct. 9, 2002

(65) Prior Publication Data

US 2003/0132388 A1 Jul. 17, 2003

(30) Foreign Application Priority Data

Jan. 11, 2002 (JP) ....................................... 2002-004220

(51) Int. Cl.[7] .................................................. G01J 1/42
(52) U.S. Cl. ............................. 250/339.15; 250/339.05
(58) Field of Search ....................... 250/339.15, 339.05, 250/339.06, 227.11, 227.29, 353, 372, 342, 341.1, 559.41, 554

(56) References Cited

U.S. PATENT DOCUMENTS 4,907,281 A * 3/1990 Hirvonen et al. ........... 382/100
5,051,590 A * 9/1991 Kern et al. ............ 250/339.04
5,225,883 A 7/1993 Carter et al.
5,677,532 A * 10/1997 Duncan et al. ........ 250/339.15
5,726,451 A * 3/1998 Ishida et al. ........... 250/339.15
5,726,632 A * 3/1998 Barnes et al. ............... 340/577
5,914,489 A * 6/1999 Baliga et al. .......... 250/339.05
5,995,008 A * 11/1999 King et al. ................. 340/578
6,239,433 B1 * 5/2001 Porter ..................... 250/338.3

FOREIGN PATENT DOCUMENTS

| | | |
|---|---|---|
| EP | 1 329 860 | 7/2003 |
| GB | 2 360 355 | 9/2001 |
| JP | 2-100797 | 12/1990 |
| JP | 6-269675 | 9/1994 |
| JP | 2000-65725 | 3/2000 |
| WO | WO 01/67415 | 9/2001 |
| WO | WO 01/73384 | 10/2001 |

* cited by examiner

*Primary Examiner*—Constantine Hannaher
*Assistant Examiner*—Otilia Gabor
(74) *Attorney, Agent, or Firm*—Blank Rome LLP

(57) ABSTRACT

A flame detection device for detecting a flame caused by a fire, including a light attenuation filter for attenuating 90% or greater of light with wavelengths in a visible to near-infrared band radiated from the flame. The flame detection device further includes an imager for photographing an image of the attenuated light incident thereon, and a processing section for deciding the flame from the image obtained by the imager.

16 Claims, 8 Drawing Sheets

FLAME DETECTION DEVICE

BACKGROUND OF THE INVENTION

1. Field of the Invention

The present invention relates generally to flame detection equipment, and more particularly to a flame detection device that decides a flame from an image obtained by photographing a monitoring object with an imager.

2. Description of the Related Art

As prior art methods of processing an image photographed by a monitoring camera and deciding a flame caused by a fire, there are known (1) a method of extracting the infrared rays in a $CO_2$ resonance radiation band which includes wavelengths peculiar to light irradiated from flames, (2) a method of extracting a flame flicker frequency which is a temporal change in the light intensity of the infrared rays in the $CO_2$ resonance radiation band, and (3) a method of extracting the detection of temporal enlargement and reduction which are the spatial behavior of the image of a burning flame. Therefore, prior art flame detection devices which perform image processing are equipped with an entrance window for protecting the interior of the device from dust, dewdrops, etc. The prior art flame detection devices are further equipped with a bandpass filter for extracting the infrared rays in the $CO_2$ resonance radiation band, an imager for photographing an image of the extracted infrared rays, a lens mechanism for projecting the image of a monitoring space onto the imager, and a processing section for processing an image signal output from the imager and deciding a flame caused by a fire.

The $CO_2$ resonance radiation band with a center wavelength of 4.5 $\mu$m which is peculiar to flames is suitable for deciding flames because it has a good signal-to-noise ratio (SNR) with respect to external light other than flames. However, infrared-ray imagers for photographing the $CO_2$ resonance radiation band require a complicated cooling structure, etc. Furthermore, the infrared-ray imagers are very expensive and of a large size.

On the other hand, as a method of detecting a flame from the infrared rays in the $CO_2$ resonance radiation band, there is known a prior art flame detector employing a pyroelectric element instead of the infrared-ray imager. The flame detector with a pyroelectric element is structurally simple and inexpensive. However, since the flame detector does not perform image processing, it cannot detect the temporal enlargement and reduction which are the spatial behavior of the image of a burning flame. Because of this, the flame detector is inferior in flame detection accuracy to the image processing method employing the infrared-ray imager.

As an inexpensive imager, there is a charged-coupled device (CCD) imager that is used in an ordinary video photographing machine, etc. The CCD imager is relatively low in price and good in performance. However, in the CCD imager, the wavelength band at which photographing is available is limited to a narrow range from visible light to near-infrared rays (about 1.2 $\mu$m) and does not reach the $CO_2$ resonance radiation band which is most characteristic of flames.

In addition, the light energy from flames is at an extremely higher level than the dynamic range of the CCD imager. Because of this, if a flame caused by a fire is photographed with a monitoring camera which employs the CCD imager, halation (signal saturation) will be caused.

In the case where a flame caused by a fire is photographed by the infrared-ray imager, the light energy from the flame will exceed the dynamic range of the imager and cause halation. Therefore, the infrared-ray imager has the same problem as the case of the above-described CCD imager. This halation cannot be suppressed even by aperture control or gain control. Because of this, the CCD imager cannot grasp the spatial behavior of a flame and is therefore unsuitable for the detection and monitoring of flames.

SUMMARY OF THE INVENTION

The present invention has been made in view of the circumstances mentioned above. Accordingly, it is an object of the present invention is to provide a small and inexpensive flame detection device which is capable of accurately deciding a flame using a CCD imager. Another object of the invention is to provide a flame detection device that is capable of easily enhancing gray-scale resolution for a flame image when employing an imager. Still another object of the invention is to provide a small and inexpensive flame detection device that makes it possible to decide a flame with a high degree of accuracy by combining an infrared sensor such as a pyroelectric element with a CCD imager.

To achieve the above objects and in accordance with the present invention, there is provided a first flame detection device for detecting a flame caused by a fire, comprising a light attenuation filter for attenuating 90% or greater of light with wavelengths in a visible to near-infrared band radiated from the flame. The first flame detection device further comprises an imager for photographing an image of the attenuated light incident thereon, and a processing section for deciding the flame from the image obtained by the imager.

In the first flame detection device of the present invention, 90% or greater of the light that is incident on the imager is attenuated by the light attenuation filter so that the quantity of the incident light is within the dynamic range of the imager. Therefore, when a flame is photographed, halation that occurs in conventional flame detection devices employing an imager can be prevented, and the spatial behavior of a flame can be grasped from an image obtained by the imager. Thus, in the first flame detection device, the sensing of a flame can be made possible by employing an imager which cannot be used in conventional flame detection devices to sense a flame caused by a fire.

In the first flame detection device of the present invention, the imager may comprise a charged-coupled device (CCD) imager. As previously described, the sensitivity of the CCD sensor is in a narrow range from a visible band to about 1.2 $\mu$m and does not reach the $CO_2$ resonance radiation band with a center wavelength of 4.5 $\mu$m which is characteristic of flames. However, since light in a wide wavelength range (ultraviolet, visible, near-infrared, and infrared ranges) is radiated from a flame, it is sufficiently possible to photograph flames with the CCD sensor. Furthermore, it is known that for the flicker and spatial behavior of a flame, the sensitive band of the CCD imager is similar to the $CO_2$ resonance radiation band. Therefore, it is sufficiently possible to decide a flame with a high degree of accuracy from an image photographed by the CCD image.

The aforementioned light attenuation filter may comprise a neutral density (ND) filter for attenuating 90% or greater of light with a predetermined wavelength in a visible to near-infrared band, and a visible light cutoff filter for cutting off light with a predetermined wavelength or less in a visible band.

In accordance with the present invention, there is provided a second flame detection device for detecting a flame caused by a fire, comprising an infrared bandpass filter for attenuating 90% or greater of light with wavelengths in an infrared band radiated from the flame. The second flame detection device further comprises an infrared imager for photographing an image of the attenuated light incident thereon, and a processing section for deciding the flame from the image obtained by the infrared imager.

The second flame detection device uses an infrared imager which has sensitivity in the $CO_2$ resonance radiation band, and 90% or greater of the infrared rays that are incident on the infrared imager is attenuated by infrared bandpass filter for attenuating 90% or greater of light. Therefore, an image signal (pixel signal) with a gray level value corresponding to infrared rays radiated from a flame is obtained making the best use of the dynamic range of the infrared imager. As a result, the resolution for the image signal can be easily enhanced, and a flame decision can be performed based on high-accuracy image processing.

Further in accordance with the present invention, there is provided a third flame detection device for detecting a flame caused by a fire, comprising a light attenuation filter for attenuating 90% or greater of light with wavelengths in a visible to near-infrared band radiated from the flame. The third flame detection device also includes an imager for photographing an image of the attenuated light incident thereon; a specific-wavelength transmitting filter for transmitting light with wavelengths in a $CO_2$ resonance radiation band; and an infrared sensor for receiving the light transmitted through the specific-wavelength transmitting filter, and converting the received light into an electrical signal. The third flame detection device further includes a processing section for deciding the flame from changes in the temporal enlargement and reduction of the image obtained by the imager, and from a flicker frequency obtained from the electrical signal output by the infrared sensor.

In a preferred form of the third flame detection device, the imager comprises a CCD imager. In addition to a flame decision based on the image processing by the CCD imager, the infrared rays in the $CO_2$ resonance radiation band are detected employing the above-mentioned specific bandpass filter and the above-mentioned infrared sensor (e.g., a pyroelectric element, etc.). Therefore, in addition to the advantages of the CCD imager, flame decision accuracy can be easily enhanced at low cost by the direct detection of the infrared rays in the $CO_2$ resonance radiation band.

Further in accordance with the present invention, there is provided a fourth flame detection device for detecting a flame caused by a fire, comprising a light attenuation filter for attenuating 90% or greater of light with wavelengths in a visible to near-infrared band radiated from the flame. The fourth flame detection device also includes an imager for photographing an image of the attenuated light incident thereon. Furthermore, the fourth flame detection device includes (1) a first infrared sensor provided with a first specific-wavelength transmitting filter which transmits light with a first wavelength lower than the center wavelength of a $CO_2$ resonance radiation band, the first infrared sensor being operative to receive the light transmitted through the first specific-wavelength transmitting filter and convert the received light into an electrical signal; (2) a second infrared sensor provided with a second specific-wavelength transmitting filter which transmits light with a second wavelength which is the center wavelength of the $CO_2$ resonance radiation band, the second infrared sensor being operative to receive the light transmitted through the second specific-wavelength transmitting filter and convert the received light into an electrical signal; (3) a third infrared sensor provided with a third specific-wavelength transmitting filter which transmits light with a third wavelength higher than the second wavelength; the third infrared sensor being operative to receive the light transmitted through the third specific-wavelength transmitting filter and convert the received light into an electrical signal; and (4) a processing section for deciding the flame from changes in the temporal enlargement and reduction of the image obtained by the imager, and from a distribution of peaks obtained from the electrical signals output by the first, second, and third infrared sensors.

In the fourth flame detection device of the present invention, in addition to a flame decision based on the image processing performed by the CCD imager, a distribution of three beak intensities in the $CO_2$ resonance radiation band is grasped by the above-mentioned three infrared sensors. Therefore, a flame decision can be performed with a higher degree of accuracy. Each of the above-described flame detection devices of the present invention may comprise an aperture mechanism for adjusting a quantity of incident light. In this instance, the aperture mechanism is able to increase or decrease the quantity of light that cannot be adjusted with the above-described light attenuation filter. For this adjustment, a gain control section may be provided in an amplification section which amplifies a signal which is input to said processing section.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Preferred embodiments of the present invention will hereinafter be described in detail with reference to the drawings.

Figure 1:
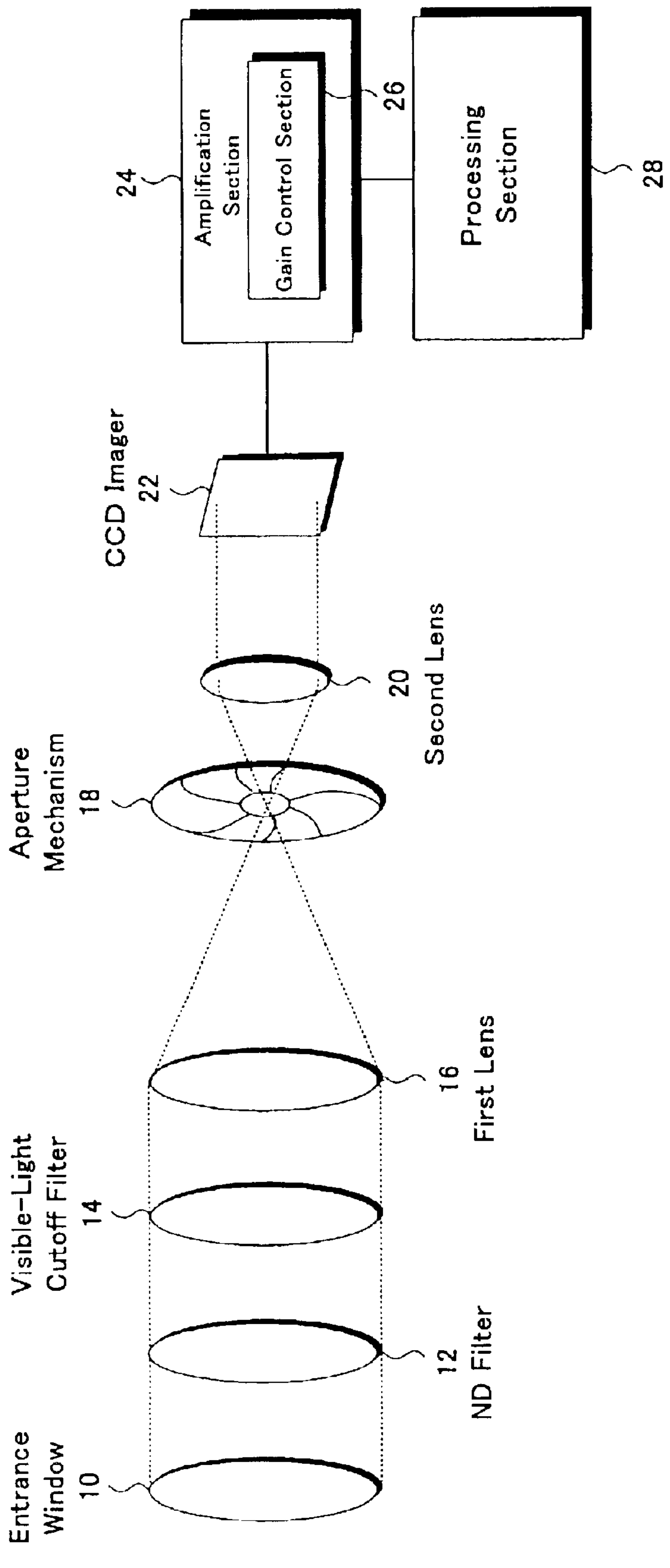
FIG. 1 is a schematic diagram of a flame detection device employing a CCD imager in accordance with a first embodiment of the present invention.

Referring now to FIG. 1, there is depicted a flame detection device constructed in accordance with a first embodiment of the present invention. The flame detection device of the first embodiment is characterized in that it employs a CCD imager. The flame detection device includes an entrance window 10, a neutral density (ND) filter 12, and a visible light cutoff filter 14. The entrance window 10 is formed from sapphire glass for purposes of preventing dust, dewdrops, and the like. The ND filter 12 constitutes a light attenuation filter that attenuates 90% or greater of the light radiated from an area to be monitored.

Figure 2:
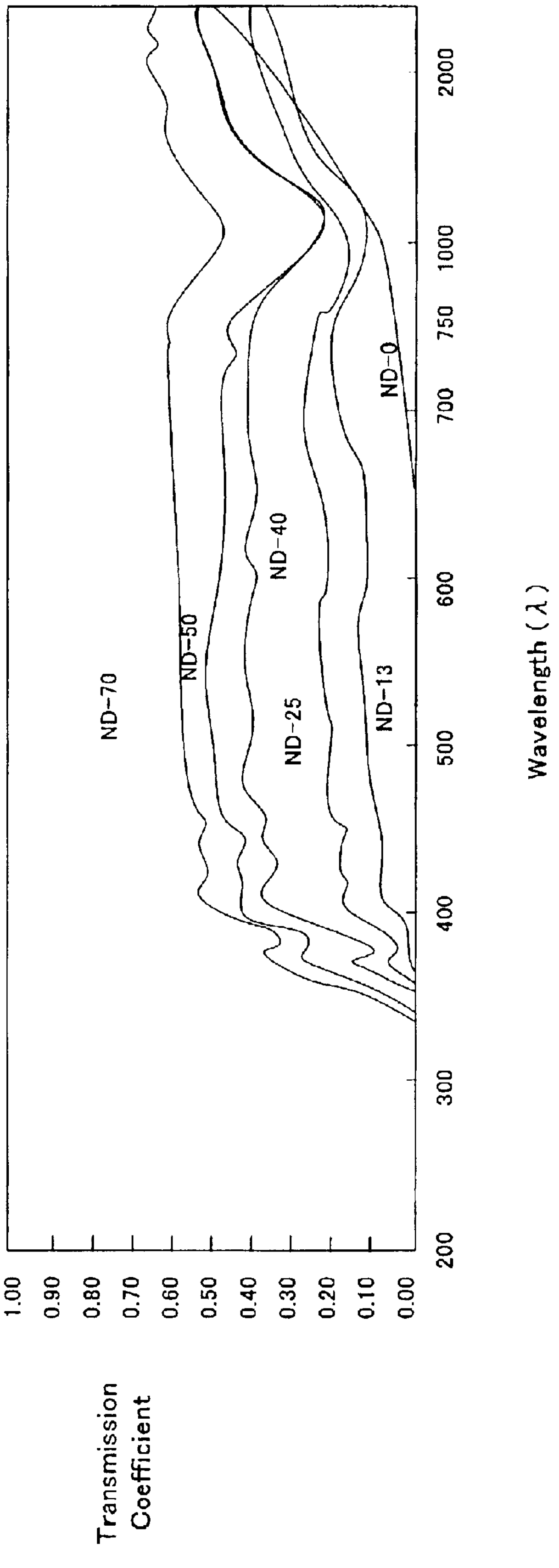
FIG. 2 is a graph used to explain the frequency characteristic of the ND filter shown in FIG. 1.

The ND filter 12 is known as a light attenuation filter for a wavelength region from visible light to near-infrared light, and has a transmission coefficient (of 0 to 1) such as that shown in FIG. 2, for example. As the ND filter 12 used in the first embodiment requires a filter characteristic whose transmission coefficient is 0.1 or less (10% or less), the first embodiment employs, for instance, an ND filter whose filter characteristic is ND-5 (not shown) set between ND-13 with a transmission coefficient of 13% and ND-0 with a transmission coefficient of 0% in FIG. 2. The visible light cutoff filter 14 cuts off, for example, the visible wavelength band of 800 nm or less which is included in the light attenuated with the ND filter 12 by 90% or greater.

The flame detection device of the first embodiment also includes an optical system and a CCD imager 22. The optical system consists of a first lens 16, an aperture mechanism 18, and a second lens 20. The light from the second lens 20 is incident on the image-forming surface of the CCD imager 22. The aperture mechanism 18 is able to further adjust the quantity of the light in which 90% or greater of the light quantity has been attenuated with the ND filter 12, and in which the visible light band has been cut off with the visible light cutoff filter 14. The CCD imager 22 has a predetermined number of CCD pixels arranged in vertical and horizontal directions, and reads out an image signal by two-dimensionally scanning each pixel signal which corresponds to the electric charge stored in accordance with the quantity of the incident light by being driven at predetermined intervals. As previously indicated, the image pickup sensitivity of the CCD imager 22 with respect to the light incident thereon is in a wavelength range from visible light to about 1.2 $\mu$m (near-infrared band) and does not reach an infrared band near 4.5 $\mu$m which is included in the $CO_2$ resonance radiation band peculiar to flames.

The flame detection device of the first embodiment further includes an amplification section 24 and a processing section 28. An image signal from the CCD imager 22 is amplified by the amplification section 24 and is output to the processing section 28. The amplification section 24 is provided with again control section 26 so that the level of the image signal read out from the CCD imager 22 can be adjusted with respect to the processing section 28. Because of this, the first embodiment shown in FIG. 1 is capable of performing an optical light-quantity adjustment and an electrical level adjustment by the aperture mechanism 18 and the gain control section 26.

For the image signal from the CCD imager 22 amplified via the amplification section 24, the processing section 28 decides the presence of a flame from the image signal, based on:

(a) the extraction of a flame flicker frequency; and (b) the extraction of the temporal enlargement and reduction of a flame image.

For the extraction of a flame flicker frequency, it is known that the flame flicker center frequency is in the vicinity of 2 to 3 Hz less than 4.5 Hz. Therefore, for the image signal from the CCD imager 22, the sum total of the gray level values for the pixels is computed with the lapse of time, and fast Fourier transformation (FFT) is performed on the computed value to detect a peak frequency. If this peak frequency is, for example, within 2 to 3 Hz peculiar to flames, the image signal is decided as a flame.

For the extraction of the temporal enlargement and reduction of a flame image, the image signal from the CCD imager 22 is binarized. Then, a flame region is extracted by labeling. By computing the area of the extracted flame region, the temporal flame enlargement and reduction are extracted and a flame is decided.

The decision of a flame in the processing section 28 may be made by either the extraction of a flicker frequency or the extraction of temporal flame enlargement and reduction. Alternatively, both may be employed to enhance decision accuracy.

Figure 3:
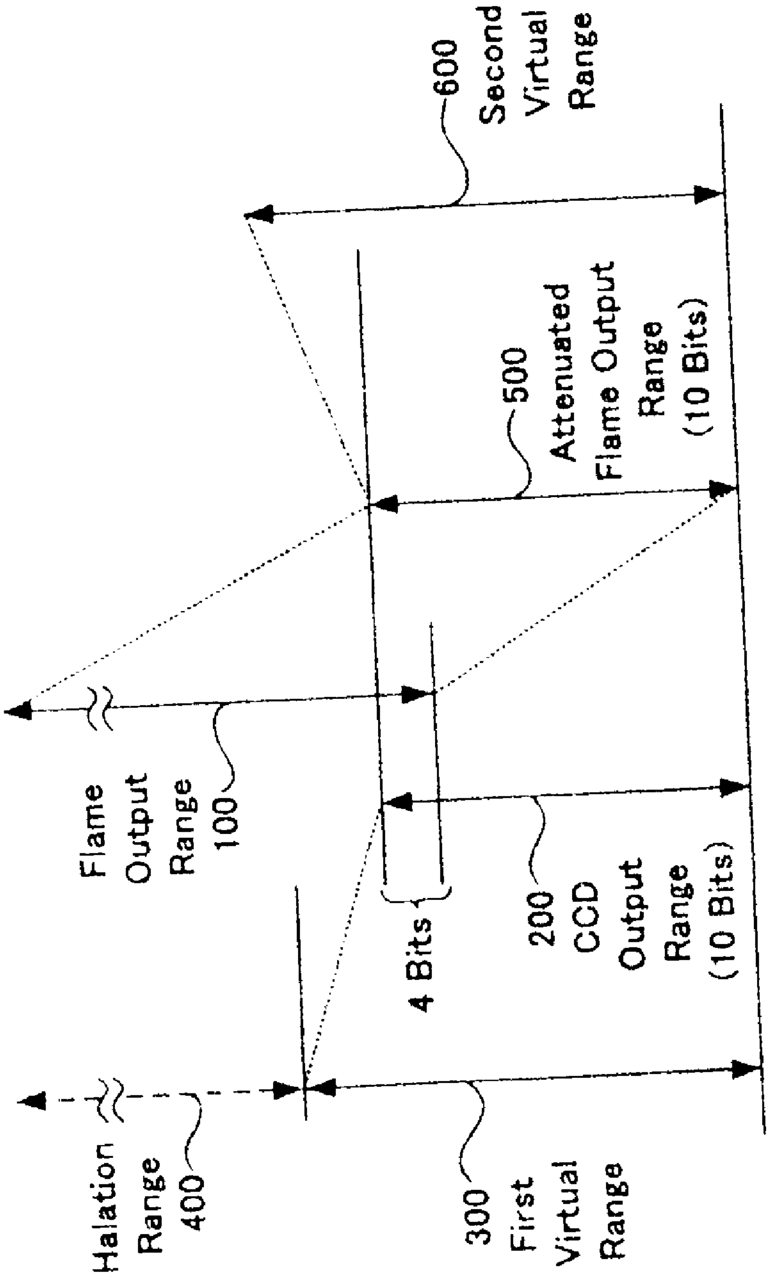
FIG. 3 shows a relationship between the quantity of incident light attenuated by the ND filter, and the output range of the CCD imager.

Referring now to FIG. 3, there is depicted a relationship between the quantity of incident light attenuated by the ND filter 12, and the output range of the CCD imager 22. Assuming the CCD imager 22 has a CCD output range 200 indicated by an arrow, a flame output range 100 that is obtained from a flame of a detecting object magnitude extends from a level near the upper limit of the CCD output range 200 to a much higher level than the CCD output range 200. The CCD output range 200 can be enlarged to a first virtual range 300 by aperture control and gain control. However, even if aperture control and gain control are performed, a range corresponding to the flame output range 100 beyond the first virtual range 300 is present as a halation range 400 (indicated by a broken line) in which halation occurs. Because of this, in the case where conventional flame detection devices employ a CCD imager, light energy from a flame is considerably high and therefore causes halation. As a result, in conventional flame detection devices employing a CCD imager, the behavior of a flame cannot be grasped.

Hence, in the flame detection device of the first embodiment, 90% or greater of incident light is attenuated by the ND filter 12. Therefore, 90% or greater of light energy from a flame is also attenuated by the ND filter 12. As a result, the above-described flame output range 100 is converted to an attenuated flame output range 500 that is within the CCD output range 200. Therefore, even if the CCD output range 200 of the CCD imager 22 is used as it is, the setting of the attenuated flame output range 500 prevents halation and enables the CCD imager 22 to photograph flames. Note that the attenuated flame output range 500 can be enlarged to a second virtual range 600 by aperture control and gain control, using the aperture mechanism 18 and gain control section 26.

Next, a description will be given of resolution based on the gray level of each pixel constituting an image signal read out from the CCD imager 22. Assuming that an image signal from each CCD pixel provided in the CCD imager 22 is 10 bits of data, the CCD output range 200 of FIG. 3 can be expressed in 10 bits of data and therefore has a resolution of 1024 gray levels. On the other hand, in the flame output range 100 before attenuation, only the upper limit portion of the CCD output range 200 of the CCD imager 22 can be effectively used to photograph flames. Therefore, the resolution for a flame analysis with respect to the flame output range 100 which enters into the CCD output range 200 is low and has, for example, 16 gray levels which correspond to 4 bits of the 10 bits.

On the other hand, in the first embodiment shown in FIG. 1, the flame output range 100 that is obtained from a flame of a detecting object magnitude is converted to the attenuated flame output range 500 which is within the CCD output range 200 of the CCD imager 22 by attenuating 90% or greater of the light which is incident on the CCD imager 22. Therefore, a resolution of 1024 gray levels based on the same 10 bits as the CCD output range 200 can be achieved for a flame analysis. In this way, the image processing for a flame decision in the processing section 28 of FIG. 1, such as the extraction of a flame flicker frequency and the detection of temporal flame enlargement and reduction changes, can be performed with a high degree of accuracy.

Next, a description will be given of how a flame caused by a fire is monitored by the first embodiment shown in FIG. 1. In the flame detection device of the first embodiment, the entrance window 10, the optical system (first lens 16, aperture mechanism 18, and second lens 20), and the CCD imager 22 are constructed as a monitor camera unit, and the amplification section 24 following the CCD imager 22 is disposed on the camera unit side. The processing section 28 may be disposed on the camera unit side, or may be realized by installing, for example, a processing program which realizes the function of inputting an image signal from the monitor camera to a personal computer or simple unit connected via a signal line and then processing the image signal.

In the case where an area is monitored by the flame detection device realized as such a camera unit, 90% or greater of the light from the monitoring area in a normal monitoring state without any fire is attenuated by the ND filter 12 and therefore the quantity of the light that is incident on the CCD imager 22 is reduced to 10% or less of the light from the monitoring area. Because of this, the level of the image signal from the CCD imager 22 obtained in a normal monitoring state is almost zero. For instance, even if the image signal is displayed on a monitor unit, the screen will go black and therefore the status of the monitoring area cannot be viewed by the naked eye.

Assuming that a flame is caused in a monitoring area by a fire, a strong light in the flame output range 100 much higher than the CCD output range 200 of the CCD imager 22 is emitted from the flame. However, 90% or greater of the emitted light is attenuated by the ND filter 12. Then, a visible region of 800 nm or less, for example, is cut off with the visible-light cutoff filter 14. Thereafter, the attenuated light is incident on the CCD imager 22 via the first lens 16, aperture mechanism 18, and second lens 20. Because of this, as shown in FIG. 3, the attenuated flame output range 500 is obtained by filter attenuation and is within the CCD output range 200 of the CCD imager 22. Therefore, even if a flame caused by a fire is photographed by the CCD imager 22, there is no halation and a flame image signal can be obtained with high resolution that is determined by the number of bits of the image signal in the CCD output range 200.

The image signal from the CCD imager 22 is amplified by the amplification section 24 in accordance with the state controlled by the gain control section 26 and is input to the processing section 28. In the processing section 28, fast Fourier transformation (FFT) is performed on a change in the brightness of the image signal to extract the flame flicker frequency and/or extract changes in the temporal enlargement and reduction of the flame image. Based on the extraction of the flame flicker frequency and/or the extraction of changes in the temporal flame enlargement and reduction, a flame decision is made. Note that in addition to monitoring a fire, the flame detection device of the first embodiment is applicable to the monitoring of burning, etc.

Figure 4:
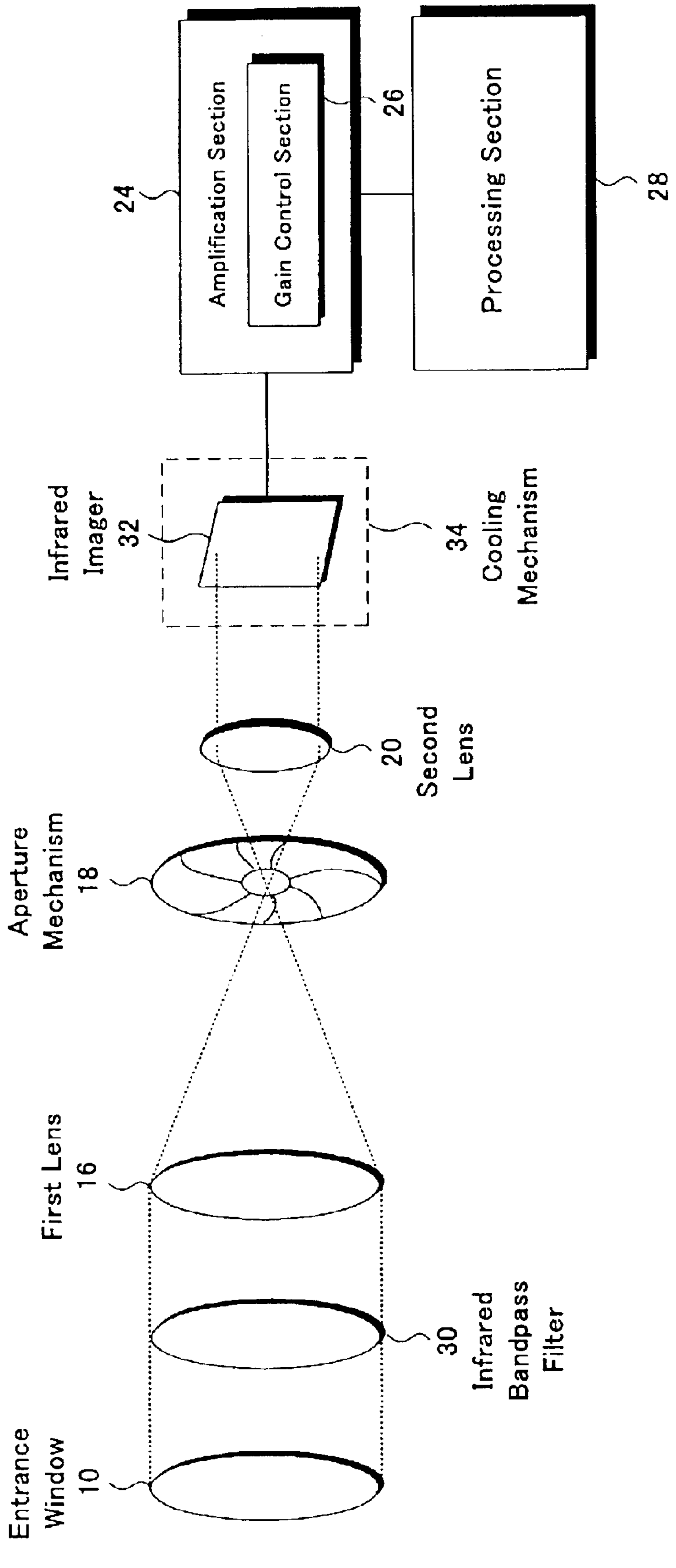
FIG. 4 is a schematic diagram of a flame detection device employing an infrared imager in accordance with a second embodiment of the present invention.

Referring now to FIG. 4, there is depicted a flame detection device constructed in accordance with a second embodiment of the present invention. The flame detection device is characterized in that it employs an infrared imager.

In FIG. 4, the flame detection device of the second embodiment includes an entrance window 10 and an infrared bandpass filter 30. The infrared bandpass filter 30 consists of a bandpass filter which allows an infrared band to pass through it, and a light attenuation filter with a transmission coefficient of 10% or less in which the light quantity of the passing infrared band is attenuated by 90% or greater. Note that the bandpass filter and the light attenuation filter maybe provided separately from each other.

The flame detection device of the second embodiment also includes an optical system and an infrared imager 32. The optical system consists of a first lens 16, an aperture mechanism 18, and a second lens 20. The infrared imager 32 has image pickup sensitivity at 4.5 μm which is in the $CO_2$ resonance radiation band peculiar to flames. The infrared imager 32 employs, for example, a PbS or PbSe array. In such an instance, the infrared imager 32 is equipped with a thermoelectric cooling structure which employs a cooling mechanism 34, and a radiating structure thereof. The infrared imager 32 may be a non-cooling type. In this case, thermistors or bolometers are arranged as a pixel array.

The flame detection device in the second embodiment further includes an amplification section 24 and a processing section 28. An image signal from the CCD imager 22 is amplified by the amplification section 24 and is output to the processing section 28. The amplification section 24 is provided with again control section 26 for adjusting the gray level of the image signal output from the infrared imager 32. The processing section 28 receives an image in an infrared wavelength band from the infrared imager 32, and performs a flame decision process, based on any one or any combination of:

(a) the extraction of the infrared rays in the $CO_2$ resonance radiation band peculiar to flames;

(b) the extraction of a flame flicker frequency due to the infrared rays in the $CO_2$ resonance radiation band; and (c) the extraction of the temporal enlargement and reduction of a flame.

In this case, the infrared rays in the $CO_2$ resonance radiation band irradiated from a flame are obtained directly from the image signal output from the infrared imager 32. Therefore, if only the center frequency 4.5 μm of the $CO_2$ resonance radiation band is detected, a flame decision can be made. In addition, since the flame flicker frequency can be obtained directly by performing fast Fourier transformation (FFT) on a change in the level of the infrared rays in the $CO_2$ resonance radiation band, a flame can be more accurately extracted. Such advantages can be obtained by conventional flame detection devices which employ an infrared imager. However, in the flame detection device of the second embodiment, 90% or greater of the light quantity of the infrared rays which are incident on the infrared imager 32 is attenuated by the infrared bandpass filter 30. Therefore, even if infrared energy whose light quantity is great is emitted from a flame and is incident on the flame detection device of the second embodiment, the light quantity of the infrared rays is attenuated within the output range of the infrared imager 32. Because of this, an infrared image signal can be obtained making the best use of the bits (e.g., 10 bits) given to the output range of the infrared imager 32.

That is, in the case where infrared rays from a f lame of a detecting object magnitude are incident on the infrared imager 32, the flame output range (see the flame output range 100 in FIG. 3) that is obtained from the flame greatly exceeds the upper limit of the output range of the infrared imager 32, as with the case of the CCD imager of FIG. 3. Because of this, there is a possibility that halation will occur. However, in the second embodiment of FIG. 4, 90% or greater of the light energy of infrared rays is attenuated by the infrared bandpass filter 30 so that the above-described flame output range is attenuated to the output range of the infrared imager 32. Therefore, an infrared image from the flame can be processed making the best use of the resolution of 10 bits given to the infrared imager 32.

Figure 5:
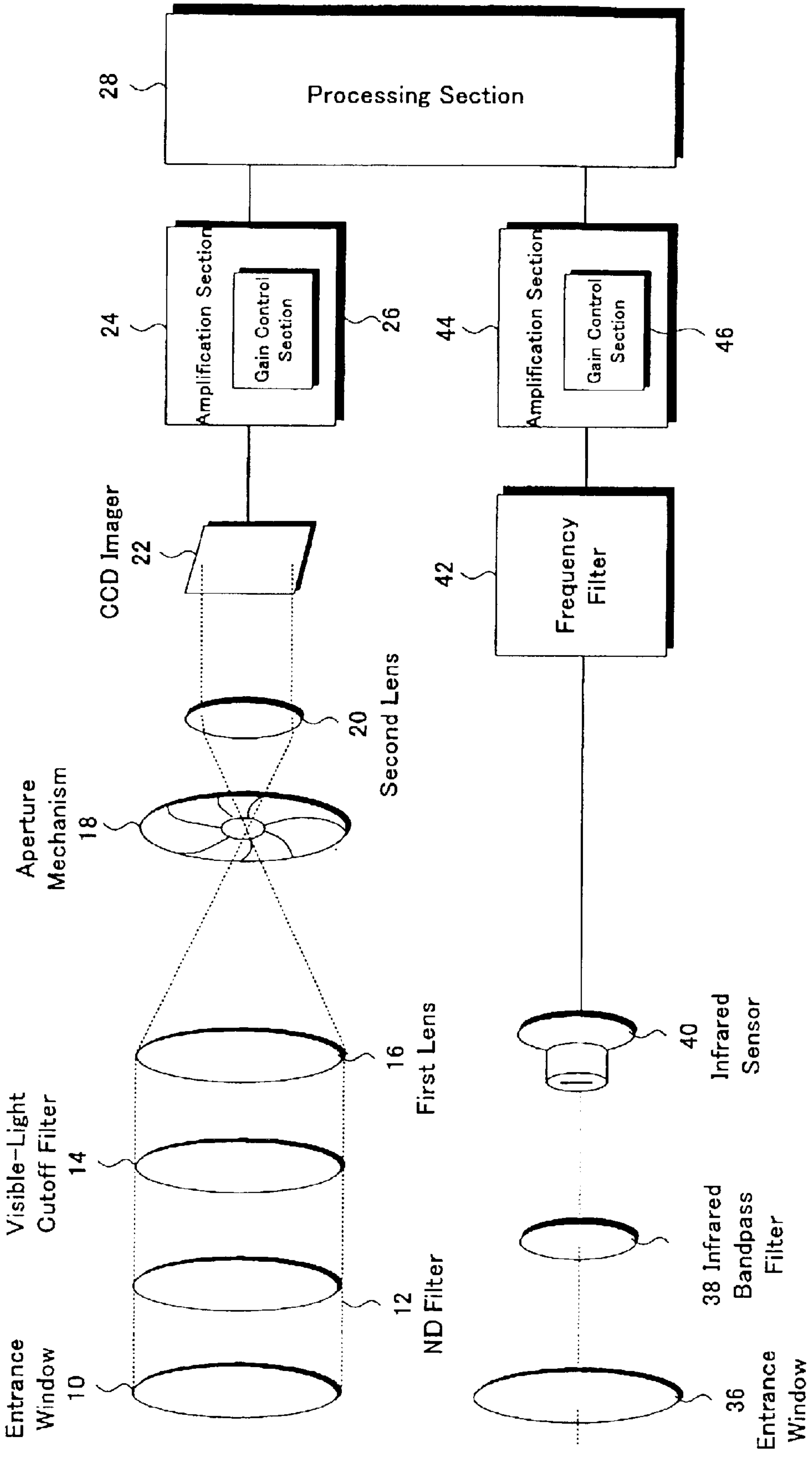
FIG. 5 is a schematic diagram of a flame detection device employing both a CCD imager and an infrared sensor in accordance with a third embodiment of the present invention.

Referring now to FIG. 5, there is depicted a flame detection device constructed in accordance with a third embodiment of the present invention. The third embodiment is characterized in that an infrared-ray sensor, for sensing the infrared rays in the $CO_2$ resonance radiation band, is combined with the first embodiment of FIG. 1.

In FIG. 5, an entrance window 10, an ND filter 12, a visible-light cutoff filter 14, a first lens 16, an aperture mechanism 18, a second lens 20, a CCD imager 22, and an amplification section 22 are identical with those of the first embodiment shown in FIG. 1. In addition to these constituent components, the flame detection device of the third embodiment further includes a second entrance window 36, an infrared narrow bandpass filter 38, an infrared sensor 40, a frequency filter 42, a second amplification section 44, and a second gain control section 46. The second entrance window 36 uses sapphire glass provided for preventing dust, dewdrops, etc. Though the second entrance window 36 is provided separately from the first entrance window 10 for making the description simpler, they may be combined together in a spectral system such as a prism.

The infrared narrow bandpass filter 38 serves as a specific wavelength selecting filter, and uses a filter with a bandpass characteristic of 4.5 μm which is the center wavelength of the $CO_2$ resonance radiation band which includes wavelengths peculiar to light radiated from flames.

The infrared sensor 40 is a sensor with detection sensitivity at the center wavelength 4.5 μm of the $CO_2$ resonance radiation band, and is able to employ, for example, a pyroelectric sensor, etc. Note that there are cases where the infrared sensor 40 is formed integrally with an infrared bandpass filter. In such an instance, the infrared narrow bandpass filter 38 becomes unnecessary.

A detection signal from the infrared sensor 40 is input to the frequency filter 42, in which a flame flicker frequency band is selected and extracted. That is, since the flame flicker frequency is present, for example, in the vicinity of 2 to 3 Hz, it is necessary to use, for example, a filter that allows 2 to 3 Hz to pass through it.

An output signal from the frequency filter 42 is amplified by the amplification section 44 and input to the processing section 28. The amplification section 44 is provided with the gain control section 46 for adjusting the level of an extraction signal in a flame flicker frequency band output from the frequency filter 42.

The processing section 28 processes the image signal output from the CCD imager 22 and extracts the temporal flame enlargement and reduction. On the other hand, for the signal extracted by the frequency filter 42, the processing section 28 is able to decide the detection of a flame flicker frequency if a signal with a predetermined level is obtained by the amplification section 44. That is, if the detection signal, obtained via the infrared detector 40, frequency filter 42, and amplification section 44, has a predetermined level, the infrared rays in the $CO_2$ resonance radiation band have been extracted and the flame flicker frequency has been extracted. Therefore, a flame decision can be made. Further, if this flame decision is combined with the flame decision based on the temporal flame enlargement and reduction, the sensing of a flame can be realized with a higher degree of accuracy.

In addition to being able to detect a flame by the CCD imager 22 which is structurally simple and low-cost, the detection of the infrared rays in the $CO_2$ resonance radiation band can be realized at low cost by the use of the structurally simple infrared detector 40. Therefore, the flame detection device of the third embodiment can be realized at low cost.

Figure 6:
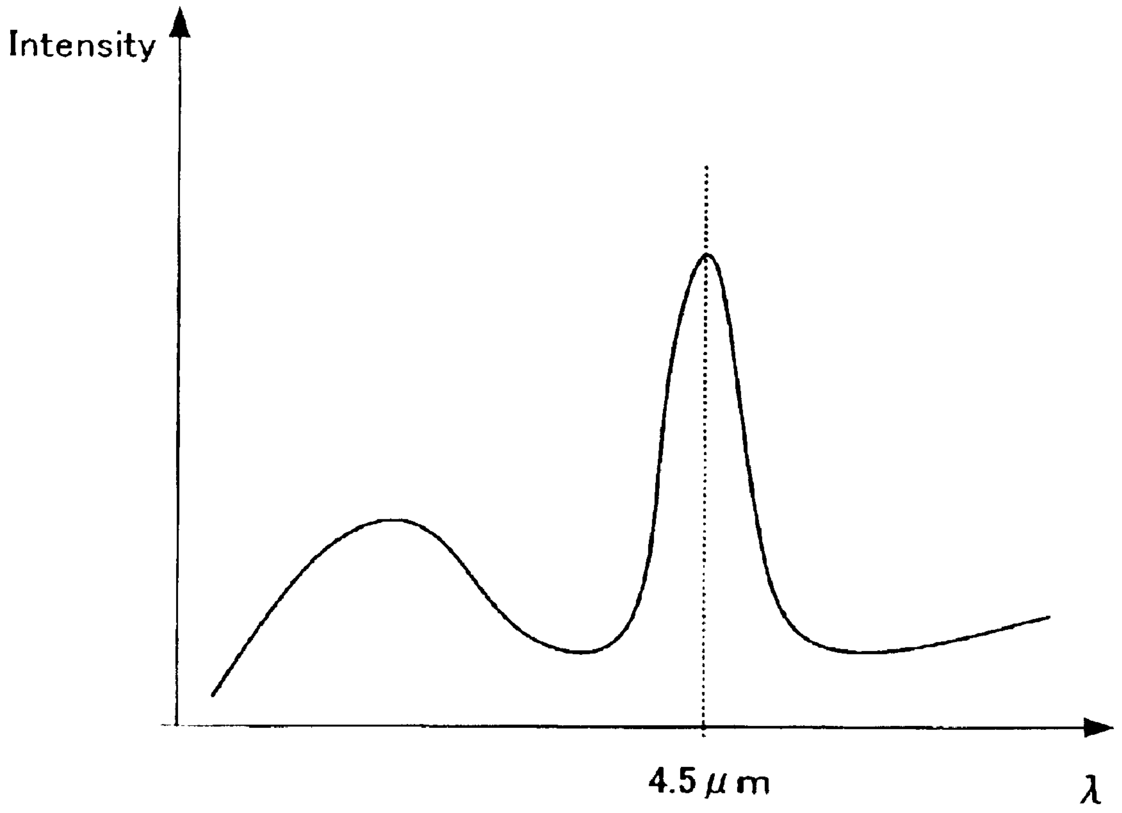
FIG. 6 is a graph of the characteristic of a $CO_2$ resonance radiation band peculiar to flames.

Referring now to FIG. 6, there is depicted an intensity distribution for the light energy in the $CO_2$ resonance radiation band that includes wavelengths peculiar to light irradiated from flames, detected by the infrared detector 40 of FIG. 5. In the intensity distribution, the intensity peaks at the center wavelength 4.5 μm of the $CO_2$ resonance radiation band and decreases sharply both sides of the peak. Therefore, if this wavelength peak is grasped, a flame decision can be reliably performed.

Figure 7:
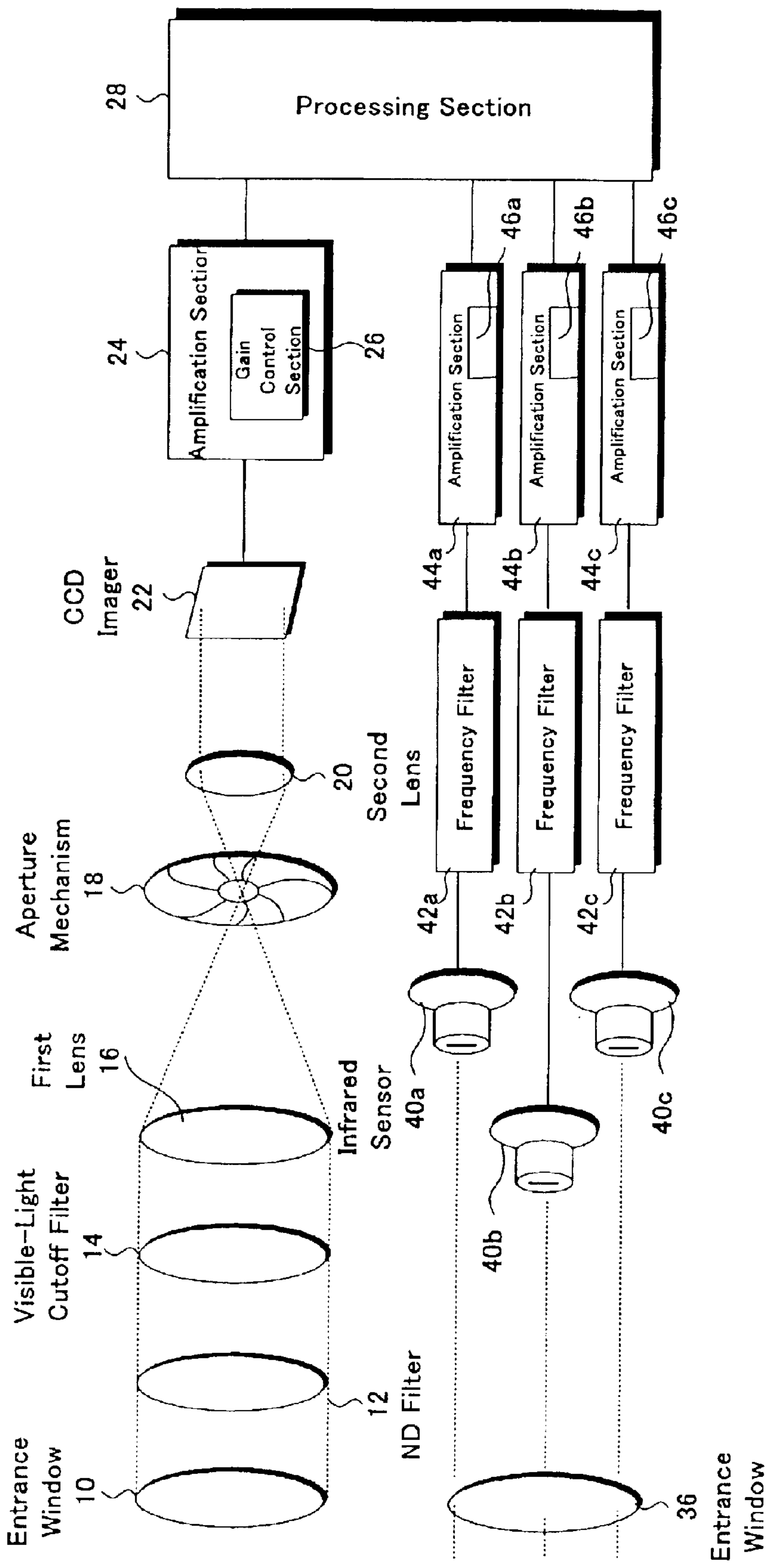
FIG. 7 is a schematic diagram of a flame detection device employing a plurality of different infrared bandpass filters in accordance with a fourth embodiment of the present invention.

Referring now to FIG. 7, there is depicted a flame detection device constructed in accordance with a fourth embodiment of the present invention. The fourth embodiment is characterized in that the peak intensity of the infrared rays in the $CO_2$ resonance radiation band is detected using a plurality of infrared sensors.

Figure 8:
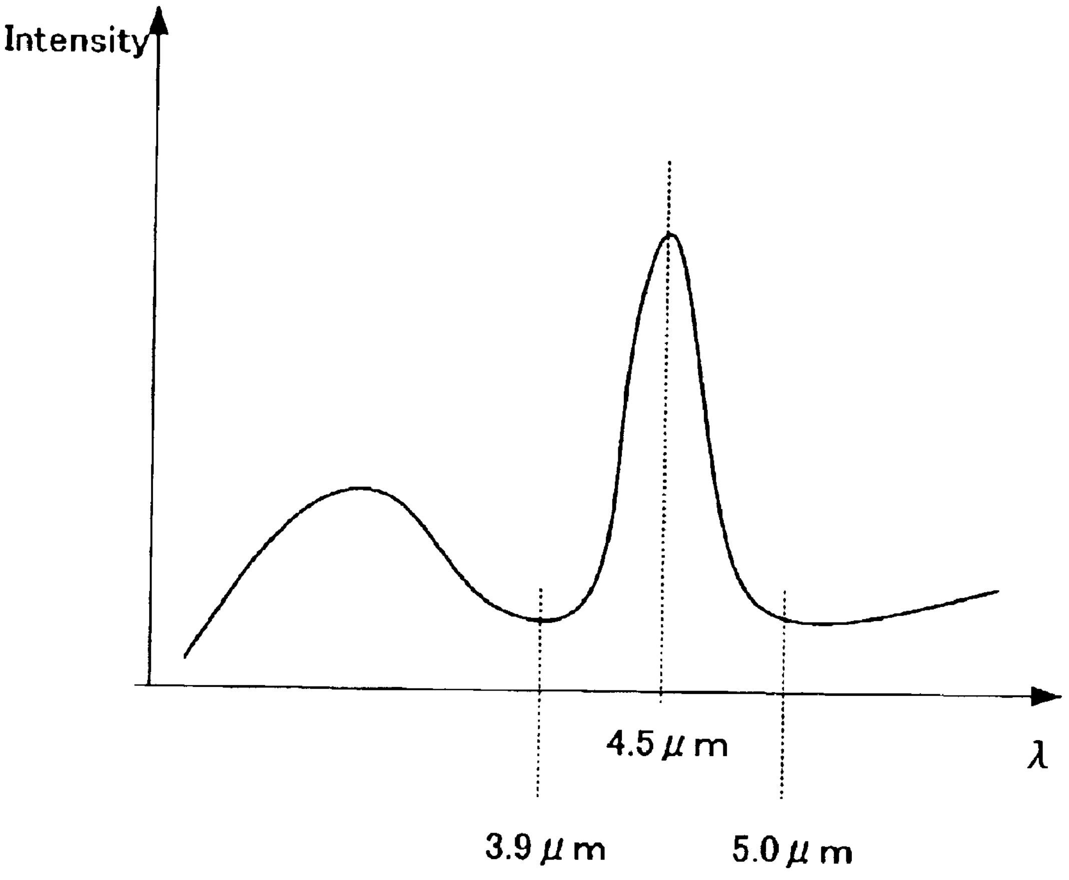
FIG. 8 is a graph of three different wavelengths in the $CO_2$ resonance radiation band that are detected by the flame detection device of the fourth embodiment.

In FIG. 7, the constituent components on the side of a CCD imager 22, as with the third embodiment of FIG. 3, are identical with those of the first embodiment of FIG. 1. In addition to these constituent components, three infrared sensors **40*a*, 40*b*, 40*c* are provided on the side of an entrance window 36 for detecting the infrared rays in the $CO_2$ resonance radiation band. The front entrance window of each of the three infrared sensors 40*a*, 40*b*, 40*c* is equipped with an infrared narrow bandpass filter. As shown in the wavelength spectrum of the $CO_2$ resonance radiation band of FIG. 8, the filter of the first infrared sensor 40*a* has a center frequency λ1 which is, for example, 3.9 μm. The filter of the second infrared sensor 40*b* has a center frequency λ2 which is the center wavelength 4.5 μm of the $CO_2$ resonance radiation band. The center wavelength λ3 of the filter of the third infrared sensor 40*c* is 5.0 μm higher than λ2 (=4.5 μm). Therefore, the infrared narrow bandpass filters of the infrared sensors 40*a* to 40*c*** are able to directly grasp a peak distribution in which the wavelength λ1 in the wavelength spectrum of the $CO_2$ resonance radiation band goes to a low level, λ2 to a peak level, and λ3 to a low level.

The outputs of the infrared sensors **40*a* to 40*c* are input to frequency filters 42*a*, 42*b*, and 42*c*, respectively. Each frequency filter extracts a flame flicker frequency, for example, a frequency band of 2 to 3 Hz. The outputs of the frequency filters 42*a* to 42*c* are amplified by amplification sections 44*a* to 44*c* having gain control sections 46*a* to 46*c* and are input to a processing section 28. Therefore, the processing section 28 can perform a flame decision by extracting a distribution of peaks in the $CO_2$ resonance radiation band such as that shown in FIG. 8, simultaneously with the detection of flame flicker frequencies from the signals output from the amplification sections 44*a* to 44*c*. In addition to the extraction of the flame flicker frequencies and the extraction of the peak distribution, a flame decision may be made using the changes in the temporal flame enlargement and reduction that are obtained from the image signal output from the CCD imager 22**.

In the fourth embodiment of FIG. 7, the infrared sensors **40*a* to 40*c* are followed by the frequency filters 42*a* to 42*c*** that extract flame flicker frequencies. However, in the case where a flame decision is performed only by extracting a distribution of peaks in the $CO_2$ resonance radiation band such as the one shown in FIG. 8, the frequency filters 42*a* to 42*c* for extracting a flame flicker frequency may be eliminated. In addition, in the fourth embodiment, the CCD imager 22 is used for image processing and only the infrared sensors 42*a* to 42*c* are used to detect the infrared rays in the $CO_2$ resonance radiation band. Therefore, the flame detection device of the fourth embodiment can be made structurally simple and low in price, compared with the case of employing an infrared imager.

As set forth above in detail, the present invention has the following advantages:

(1) In the first embodiment of FIG. 1, 90% or greater of the light that is incident on the CCD imager 22 is attenuated by the ND filter (light attenuation filter) 12 so that the quantity of the incident light is within the dynamic range of the CCD imager 22. Therefore, when a flame is photographed, halation that occurs in conventional flame detection devices employing a CCD imager can be prevented, and a flame decision can be reliably made by processing an image signal output from the CCD imager 22 that is structurally simple and low in cost.

(2) In the second embodiment of FIG. 4, 90% or greater of the infrared rays that are incident on the infrared imager 32 is attenuated by the infrared bandpass filter 30. Therefore, an image signal with a gray level value corresponding to infrared rays radiated from a flame is obtained making the best use of the dynamic range of the infrared imager 32. Additionally, the resolution for the image signal can be easily enhanced and the image processing for the sensing of a flame can be performed with a high degree of accuracy.

(3) In the third embodiment of FIG. 5, in addition to a flame decision based on the detection of a flame image by the CCD imager 22, the infrared rays in the $CO_2$ resonance radiation band are detected employing the specific bandpass filter 38 and the infrared sensor 40. Therefore, in addition to the advantages of the CCD imager 22, flame decision accuracy can be easily enhanced at low cost by the direct detection of the infrared rays in the $CO_2$ resonance radiation band.

(4) In the fourth embodiment of FIG. 7, in addition to a flame decision based on the image processing performed by the CCD imager 22, a distribution of beak intensities in the $CO_2$ resonance radiation band is grasped by a plurality of specific bandpass filters and infrared sensors. Therefore, a flame decision can be performed with a higher degree of accuracy.

While the present invention has been described with reference to the preferred embodiments thereof, the invention is not to be limited to the details given herein. As this invention may be embodied in several forms without departing from the spirit of the essential characteristics thereof, the present embodiments are therefore illustrative and not restrictive. Since the scope of the invention is defined by the appended claims rather than by the description preceding them, all changes that fall within the metes and bounds of the claims, or equivalence of such metes and bounds thereof are therefore intended to be embraced by the claims.

What is claimed is:

1. A flame detection device for detecting a flame caused by a fire, comprising:

a light attenuation filter for attenuating 90% or greater of light with wavelengths in a visible to near-infrared band radiated from said flame;

an imager for photographing an image of said attenuated light incident thereon; and a processing section for determining said flame from said image obtained by said imager.

2. The flame detection device as set forth in claim 1, wherein said imager comprises a charged-coupled device (CCD) imager.

3. The flame detection device as set forth in claim 2, wherein said light attenuation filter comprises:

a neutral density (ND) filter for attenuating 90% or greater of light with a predetermined wavelength in a visible to near-infrared band; and a visible light cutoff filter for cutting off light with a predetermined wavelength or less in a visible band.

4. The flame detection device as set forth in claim 1, wherein said light attenuation filter comprises:

a neutral density (ND) filter for attenuating 90% or greater of light with a predetermined wavelength in a visible to near-infrared band; and a visible light cutoff filter for cutting off light with a predetermined wavelength or less in a visible band.

5. The flame detection device as set forth in claim 1, further comprising an aperture mechanism for adjusting a quantity of incident light.

6. The flame detection device as set forth in claim 1, further comprising:

an amplification section for amplifying a signal which is input to said processing section; and a gain control section provided in said amplification section.

7. A flame detection device for detecting a flame caused by a fire, comprising:

an infrared bandpass filter for attenuating 90% or greater of light with wavelengths in an infrared band radiated from said flame;

an infrared imager for photographing an image of said attenuated light incident thereon; and a processing section for determining said flame from said image obtained by said infrared imager.

8. The flame detection device as set forth in claim 7, further comprising an aperture mechanism for adjusting a quantity of incident light.

9. The flame detection device as set fourth in claim 7, further comprising:

an amplification section for amplifying a signal which is input to said processing section; and a gain control section provided in said amplification section.

10. A flame detection device for detecting a flame caused by a fire, comprising:

a light attenuation filter for attenuating 90% or greater of light with wavelengths in a visible to near-infrared band radiated from said flame;

an imager for photographing an image of said attenuated light incident thereon;

a specific-wavelength transmitting filter for transmitting light with wavelengths in a $CO_2$ resonance radiation band;

an infrared sensor for receiving said light transmitted through said specific-wavelength transmitting filter, and converting the received light into an electrical signal; and a processing section for determining said flame from changes in the temporal enlargement and reduction of said image obtained by said imager, and from a flicker frequency obtained from said electrical signal output by said infrared sensor.

11. The flame detection device as set forth in claim 10, wherein said imager comprises a CCD imager.

12. The flame detection device as set forth in claim 10, further comprising an aperture mechanism for adjusting a quantity of incident light.

13. The flame detection device as set forth in claim 10, further comprising:

an amplification section for amplifying a signal which is input to said processing section; and a gain control section provided in said amplification section.

14. A flame detection device for detecting a flame caused by a fire, comprising:

a light attenuation filter for attenuating 90% or greater of light with wavelengths in a visible to near-infrared band radiated from said flame;

an imager for photographing an image of said attenuated light incident thereon;

a first infrared sensor provided with a first specific-wavelength transmitting filter which transmits light with a first wavelength lower than the center wavelength of a $CO_2$ resonance radiation band, said first infrared sensor being operative to receive said light transmitted through said first specific-wavelength transmitting filter and convert the received light into an electrical signal;

a second infrared sensor provided with a second specific-wavelength transmitting filter which transmits light with a second wavelength which is the center wavelength of said $CO_2$ resonance radiation band, said second infrared sensor being operative to receive said light transmitted through said second specific-wavelength transmitting filter and covert the received light into an electrical signal;

a third infrared sensor provided with a third specific-wavelength transmitting filter which transmits light with a third wavelength higher than said second wavelength; said third infrared sensor being operative to receive said light transmitted through said third specific-wavelength transmitting filter and convert the received light into an electrical signal; and a processing section for determining said flame from changes in the temporal enlargement and reduction of said image obtained by said imager, and from a distribution of peaks obtained from said electrical signals output by said first, second, and third infrared sensors.

15. The flame detection device as set forth in claim 14, further comprising an aperture mechanism for adjusting a quantity of incident light.

16. The flame detection device as set forth in claim 14, further comprising:

an amplification section for amplifying a signal which is input to said processing section; and a gain control section provided in said amplification section.

* * * * *